(12) United States Patent
Hashimoto

(10) Patent No.: US 8,359,640 B2
(45) Date of Patent: Jan. 22, 2013

(54) PRINTING APPARATUS MANAGEMENT SYSTEM, PRINTING APPARATUS MANAGEMENT METHOD, AND PRINTING APPARATUS MANAGEMENT PROGRAM

(75) Inventor: Kiyoshi Hashimoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1016 days.

(21) Appl. No.: 12/370,570

(22) Filed: Feb. 12, 2009

(65) Prior Publication Data

US 2009/0210931 A1 Aug. 20, 2009

(30) Foreign Application Priority Data

Feb. 14, 2008 (JP) ................................. 2008-033227

(51) Int. Cl.
- G06F 7/04 (2006.01)
- G06F 15/16 (2006.01)
- G06F 17/30 (2006.01)
- H04L 29/06 (2006.01)

(52) U.S. Cl. .......................................... 726/6; 358/1.15

(58) Field of Classification Search ........................ 726/6
See application file for complete search history.

(56) References Cited

U.S. PATENT DOCUMENTS

| | | | | |
|---|---|---|---|---|
| 7,202,965 B2* | 4/2007 | Korn | ............................. | 358/1.15 |
| 2003/0002071 A1* | 1/2003 | Berkema et al. | ............. | 358/1.15 |
| 2003/0107781 A1* | 6/2003 | Ozawa | .......................... | 358/506 |
| 2005/0029353 A1* | 2/2005 | Isemura et al. | ................ | 235/454 |
| 2005/0093945 A1* | 5/2005 | Silverbrook | ..................... | 347/86 |
| 2006/0007469 A1* | 1/2006 | Uruma | .......................... | 358/1.14 |
| 2007/0022467 A1* | 1/2007 | Filbrich | ............................. | 726/2 |
| 2007/0058189 A1* | 3/2007 | Yaguchi | ........................ | 358/1.13 |
| 2009/0122350 A1* | 5/2009 | Alverson et al. | ............. | 358/3.28 |

FOREIGN PATENT DOCUMENTS

JP 2006-134045 A 5/2006

* cited by examiner

*Primary Examiner* — William Powers
*Assistant Examiner* — Dant Shaifer Harriman
(74) *Attorney, Agent, or Firm* — Kilpatrick Townsend & Stockton LLP

(57) ABSTRACT

A printing apparatus management system includes: a printing apparatus which includes an IC tag performing wireless communication with the outside and a memory being connected to the IC tag; and a first information terminal which has at least a function of writing information in the memory through wireless communication with the IC tag. The first information terminal maintains authentication data used by the printing apparatus, writes the authentication data in the memory, and transmits the authentication data to another information terminal. In addition, the printing apparatus interrupts a predetermined function, when the authentication data is written by the first information terminal, and in a state where authentication data is written in the memory by the first information terminal or an information terminal other than the first information terminal in the interruption state, the printing apparatus makes the predetermined function effective, when the authentication data written by the first information terminal before the interruption state and the authentication data written by the first information terminal or the information terminal other than the first information terminal after the interruption state accord with each other.

9 Claims, 10 Drawing Sheets

FIG. 11

| RANK | PRINT | COPY | SCANNER | LEVEL PRINT | BACKUP | COLOR/ MONOCHROME | PRINT QUALITY | ... |
|---|---|---|---|---|---|---|---|---|
| A | USABLE | USABLE | USABLE | USABLE | USABLE | BOTH ARE USABLE | ALL QUALITIES ARE USABLE | ... |
| B | USABLE | USABLE | USABLE | NO USABLE | NO USABLE | BOTH ARE USABLE | ALL QUALITIES ARE USABLE | ... |
| C | USABLE | USABLE | USABLE | NO USABLE | NO USABLE | ONLY MONOCHROME | ONLY STANDARD QUALITY | ... |
| ... | ... | ... | ... | ... | ... | ... | ... | ... |

200

PRINTING APPARATUS MANAGEMENT SYSTEM, PRINTING APPARATUS MANAGEMENT METHOD, AND PRINTING APPARATUS MANAGEMENT PROGRAM

This application claims priority under 35 U.S.C. §119 to Japanese Patent Application No. 2008-033227, filed Feb. 14, 2008, the entire disclosure of which is expressly incorporated by reference herein.

BACKGROUND

1. Technical Field

The present invention relates to a printing apparatus management system, a printing apparatus management method, and a printing apparatus management program.

2. Related Art

Sometimes, it is intended that a printer is (printing apparatus) installed in a public place (for example, a lodging house or a shop) and the printer is permitted to be used for only specific users (for example, users in the lodging house or the shop). In this case, when cost associated with consumption supplies such as ink or print sheets is taken into consideration, it is necessary for an owner (also called a manager) of the printer to strictly manage the printer so that only users permitted to use the printer use the printer.

As a method of managing the printer, a technique for inputting a predetermined personal identification number of a user at the time of using a printer was known.

There was also known a technique for authenticating a user permitted to use a printer by distributing an IC card storing identification information and allowing the printer to read the identification information recorded in the IC card before use of the printer.

There was also known a public printing system in which computer terminals operated by users, a center server managing the printable number corresponding to the prepaid price and the printable number based on an authentication key, and a print server (and printer) installed in a shop are connected to each other through a network (see JP-A-2006-134045). In the public printing system, when the user inputs the authentication key issued at the time of paying a use fee to the computer terminal, the computer terminal queries the printable number to the center server by use of the authentication key. When the number of printing is within the printable number, a printing work is created and the printing work is transmitted to the print server.

The above-mentioned known techniques have problems as follows. That is, when the personal identification number is used as in the above description, the personal identification number may be revealed to users other than the permitted users. Then, the personal identification number is useless. In addition, when the personal identification is frequently changed and notified to the permitted users or a watchman that watches illegal use is posted near a printer, an increase in management cost of the printer is caused. In order to realize authentication by use of an IC card owned by a user, a reader/writer device for reading information of the IC card or updating the information of the IC card has to be mounted (or connected) on a printer. However, the reader/writer device of the IC card is costly. For this reason, the authentication method based on the information of the IC card described above also causes the management cost of a printer to increase.

In JP-A-2006-134045, the center server just authenticates the computer terminal to be operated by a user and a direct operation of the printer in the place where the print server (printer) is installed is not controlled. For this reason, the use of the printer in the public place where the printer is installed cannot be managed and restricted. Additionally, in JP-A-2006-134045, the public printing system is very expensive in realization, in that the public printing system includes the computer terminals of users, the center server, the print server, and the printer in the shop, and the network connecting these apparatuses is large-scale.

SUMMARY

An advantage of some aspects of the invention is that it provides a printing apparatus management system, a printing apparatus management method, and a printing apparatus management program capable of realizing use management and use restriction on apparatuses such as a printing apparatus installed in a public place with reduced cost.

According to an aspect of the invention, there is provided a printing apparatus management system including: a printing apparatus which includes an IC tag performing wireless communication with the outside and a memory being connected to the IC tag; and a first information terminal which has at least a function of writing information in the memory through wireless communication with the IC tag. The first information terminal maintains authentication data used by the printing apparatus, writes the authentication data in the memory, and transmits the authentication data to another information terminal. The maintaining of the authentication data includes both a case of maintaining the authentication data after the first information terminal generates the authentication and a case of acquiring and maintaining the authentication data acquired from the outside by the first information terminal. The printing apparatus interrupts a predetermined function, when the first information terminal writes the authentication data, and in a state where the first information terminal or an information terminal other than the first information terminal writes authentication data in the memory in the interruption state, the printing apparatus makes the predetermined function effective, when the authentication data written by the first information terminal before the interruption state and the authentication data written by the first information terminal or the information terminal other than the first information terminal after the interruption state accord with each other.

In the printing apparatus management system according to this aspect of the invention, the first information terminal writes the authentication data to the printing apparatus and another information terminal. The printing apparatus interrupts the predetermined function (for example, a print function), when the authentication data is written by the first information terminal, compares with the subsequently written authentication data, and cancels the interruption state of the predetermined function to make the predetermined function effective, when the authentication data accord with each other. Accordingly, the use of the printing apparatus is limited to a user of the information terminal having the authentication data. In addition, the printing apparatus is very cheap, since the printing apparatus has only the IC tag for carrying out communication with the information terminal.

The printing apparatus may be connected to the IC tag by attaching or embedding the IC tag to or in the printing apparatus and connecting an electrode of a memory provided in advance in the printing apparatus to an electrode of the IC tag. With such a simple configuration, the data can be supplied from the information terminal to the printing apparatus through the IC tag.

Alternatively, the printing apparatus may further include a connector used to mount an external memory and may be connected to the IC tag by mounting the external memory connected to the IC tag on the connector. That is, when the IC tag and the printing apparatus are connected to each other, the connector provided in the printing apparatus may be used.

The printing apparatus may make the predetermined function effective only within predetermined time, when it is determined that the authentication data accord with each other.

When it is determined that the authentication data accord with each other, the printing apparatus may inspect whether to continuously carry out the wireless communication with the information terminal writing the accorded authentication data after the interruption state and may make the predetermined function effective only within time in which the wireless communication is continuously carried out.

When it is determined that the authentication data accord with each other, the printing apparatus may make the predetermined function effective only within time in which a consumed amount of a consumption supply in the printing apparatus does not exceeds a predetermined consumed amount.

In this way, it is possible to strictly manage the use of the printing apparatus installed in a public place, by limiting the state where the predetermined function is effective on the basis of time, the communication state between the information terminal and the printing apparatus, or the consumed amount of a consumption supply.

The first information terminal may generate plural different authentication data, write the plural different authentication data in the memory, and transmit several authentication data among the plural authentication data to another information terminal. In a state where an information terminal other than the first information terminal writes authentication data in the memory in the interruption state, the printing apparatus may make only a function according to the authentication data written by the information terminal other than the first information terminal effective, when the authentication data written by the information terminal other than the first information terminal accords with one of the authentication data written by the first information terminal before the interruption state. With such a configuration, a manager of the printing apparatus can supply a different service for every user by making an effective function different according to the kinds of authentication data written after the function of the printing apparatus is interrupted.

The first information terminal may generate cancellation data used for the printing apparatus to cancel the interruption state and write the cancellation data in the memory together with the authentication data. In a state where the first information terminal writes the cancellation data in the memory in the interruption state, the printing apparatus cancels the interruption state and erases the authentication data and the cancellation data written in the memory, when the cancellation data written before the interruption state and the cancellation data written after the interruption state accord with each other. With such a configuration, it is possible to return the printing apparatus to the state before the interruption state and subsequently allow the first information terminal to write new authentication data or new cancellation data to the printing apparatus.

The technical spirit of the invention is understandable from other aspects of the invention other than the printing apparatus management system described above. That is, according another aspect of the invention, there is provided a printing apparatus management method including processes performed by the first information terminal or the printing apparatus described above. In addition, according to still another aspect of the invention, there is provided a printing apparatus management program causing the first information terminal or the printing apparatus described above to execute processes (steps) performed by the first information terminal or the printing apparatus. Of course, the first information terminal or the printing apparatus can be grasped as one aspect of the invention, respectively, and a printing apparatus management system further including another information terminal (an information terminal other than the first information terminal, which is also called a second information terminal) can be grasped as one aspect of the invention.

BRIEF DESCRIPTION OF THE DRAWINGS

The invention will be described with reference to the accompanying drawings, wherein like numbers reference like elements.

FIG. 11 is a diagram illustrating an information table.

DESCRIPTION OF EXEMPLARY EMBODIMENTS

An embodiment of the invention will be described with reference to the drawings in the following order:
 1. Overview of Printing Apparatus Management System,
 2. Management of Printer Function,
 2-1. Registration Process of Authentication Data and Cancellation Data,
 2-2. Authentication Process of Information Terminal,
 2-3. Security Mode Cancellation Process,
 3. Other Embodiments, and
 4. Summary.

1. Overview of Printing Apparatus Management System

Figure 1:
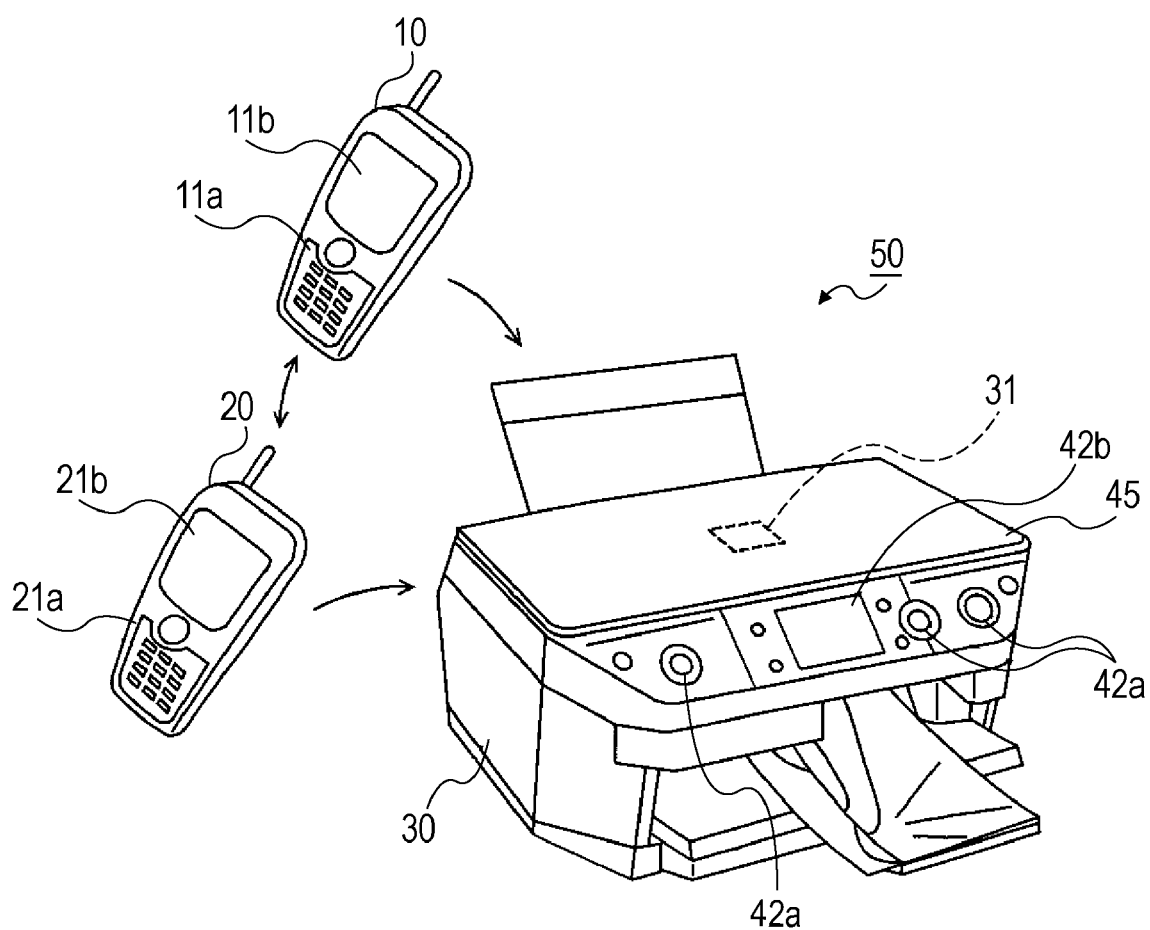
FIG. 1 is a diagram illustrating an example of a printing apparatus management system.

FIG. 1 is a diagram simply illustrating a printing apparatus management system 50 according to an embodiment. The printing apparatus management system 50 includes an information terminal 10 and a printer 30. The information terminal 10 corresponds to a first information terminal. As an example of the information terminal 10, a cellular phone will be described. The printer 30 is a so-called multi-function type printer. Functions of the printer 30 are not limited, but the printer 30 has a scanner function, a copy function, a surface printing (label printing) function on the surface of predetermined small disk media (CD-R or DVD), and a backup function of storing data recorded in a predetermined memory card or the like to the disk media or the like in addition to a print function (including a so-called direct print function). In this embodiment, it is assumed that the printer 30 is installed in a public place by a manager of the printer 30. The information terminal 10 will be described under the assumption that the information terminal 10 is an information terminal being used by the manager of the printer 30.

The printing apparatus management system 50 may additionally include an information terminal 20. The information terminal 20 corresponds to another information terminal. In this embodiment, it is assumed that the information terminal 20 is also a cellular phone. The information terminal 20 is an information terminal being used by a user that is permitted to use the printer 30 by the manager, and the number of the information terminals 20 is not limited. In addition, the information terminals 10 and 20 may not be the cellular phone and any apparatus can be used as long as the information terminals 10 and 20 are a portable information terminal capable of carrying out respective processes described below.

As a characteristic of this embodiment, the printer 30 includes an IC tag 31. The IC tag 31 is a card type tag or a sealed tag which includes an IC chip and an IC chip antenna. The IC tag 31 is attached to a predetermined location of the printer 30. Alternatively, the IC tag 31 may be embedded in the vicinity of the surface of the printer 30.

The information terminals 10 and 20 have a function of writing information by the IC tag 31 and a function of reading information from the IC tag 31. The information terminals 10 and 20 carry out wireless communication with the IC tag 31 by use of a non-contact type communication standard called an NFC (Near Field Communication), for example, when the information terminals 10 and 20 approach the IC tag 31. In the NFC standard, the communication is carried out by use of an electromagnetic induction method.

Figure 2:
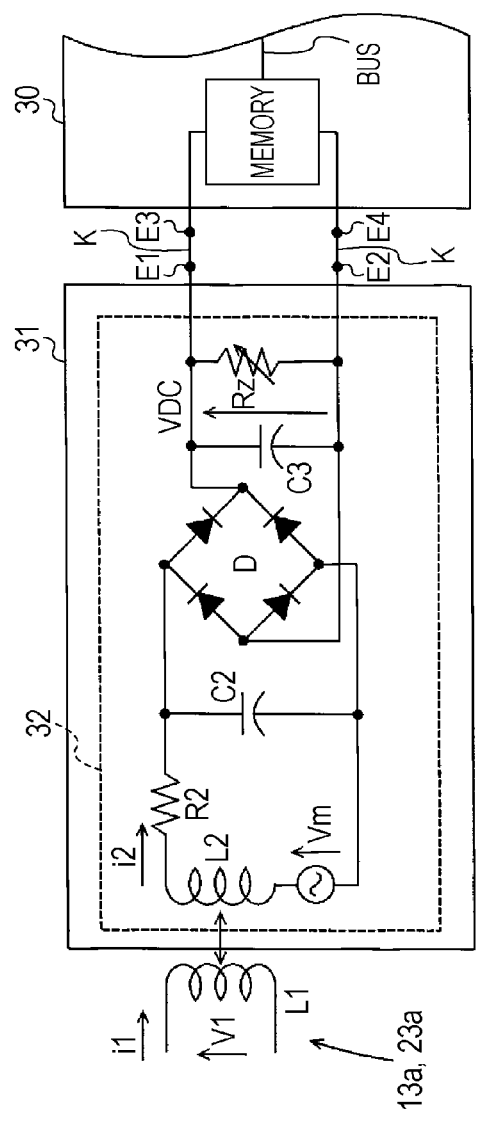
FIG. 2 is a diagram illustrating an example of connection between an IC tag and a printer.

FIG. 2 is a diagram illustrating connection between the IC tag 31 and the printer 30.

An antenna coil L1 is an antenna coil included in each of an NFC communication sections 13a and 23a of the information terminals 10 and 20, respectively. Each of the NFC communication sections 13a and 23a generates electromagnetic field by flowing current i1 to the antenna coil L1. When each of the NFC communication sections 13a and 23a generate the electromagnetic field in a state where each of the NFC communication sections 13a and 23a is located at a predetermined close position with the IC tag 31, electric power is induced to an antenna coil L2 on a side of a circuit 32 of the IC tag 31. Electric waves in which the electromagnetic field is generated become carrier waves of data to be transmitted by each of the NFC communication sections 13a and 23a. Induced current i2 generated on the side of the antenna coil L2 is smoothed through a loss resistor R2 and a rectification-smoothing circuit D, and the voltage of the induced current i2 is adjusted by a variable resistor Rz.

In this embodiment, a pair of electrodes E1 and E2 included in a circuit 32 are respectively connected to a pair of electrodes E3 and E4 extracted from a memory 34 provided in advance in the printer 30 through signal lines K. With such a configuration, data supplied from each of the NFC communication sections 13a and 23a and received by the circuit 32 are sent to the memory 34 and written in the memory 34 through the signal lines K connecting the electrodes. The IC tag 31 also includes a control unit 33 (see FIG. 4) controlling processes such as a writing process of writing the received data in the memory 34. In FIG. 2, the memory 34 is configured to be located outside the IC tag 31 (inside the printer 30), but the memory 34 may be configured to be located inside the IC tag 31.

The location of the IC tag 31 in the printer 30 is not particularly limited, as long as it is easy for a manager or a user to approach the information terminal 10 or 20. For example, as shown by a chain line of FIG. 1, the IC tag 31 can be attached onto an upper surface 45 of the printer 30.

Figure 3:
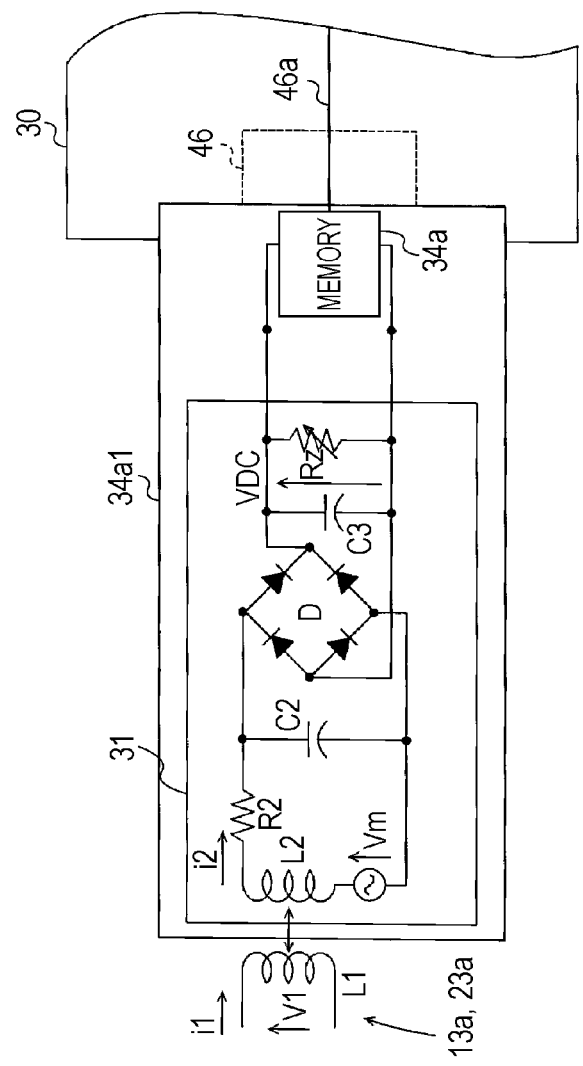
FIG. 3 is a diagram illustrating an example of another connection between the IC tag and the printer.

FIG. 3 is a diagram illustrating an example of connection between the IC tag 31 and the printer 30, the connection being different from that of FIG. 2. In FIG. 3, the printer 30 includes a connector 46 (for example, a USB connector) for mounting an external memory 34a (for example, a USB memory). With such a configuration, the IC tag 31 is attached to or embedded in a case 34a1 of an external memory 34a, and the IC tag 31 and the external memory 34a are connected to each other. In the configuration shown in FIG. 3, the data transmitted from each of the NFC communication sections 13a and 23a can be received and written to the external memory 34a through the IC tag 31. The printer 30 can acquire the data transmitted from each of the NFC communication sections 13a and 23a by connection with the external memory 34a through the connector 46 and a bus 46a (for example, a USB bus).

As the external memory 34a, memories of various standards other than the USB memory can be used. For example, when the printer 30 includes a connector (memory card slot) into which a memory card can be inserted, the IC tag 31, the external memory, and the printer 30 can be connected to each other, by connecting the memory card (external memory) inserted into the memory card slot to the IC tag 31 through a communication cable or the like. Alternatively, even in a case where the printer 30 does not have a memory card slot, when a memory card reader into which a memory card is inserted is connected to the connector 46 and the IC tag 31 is attached to the memory card reader, the IC tag 31, the external memory, and the printer 30 are connected to each other.

Figure 4:
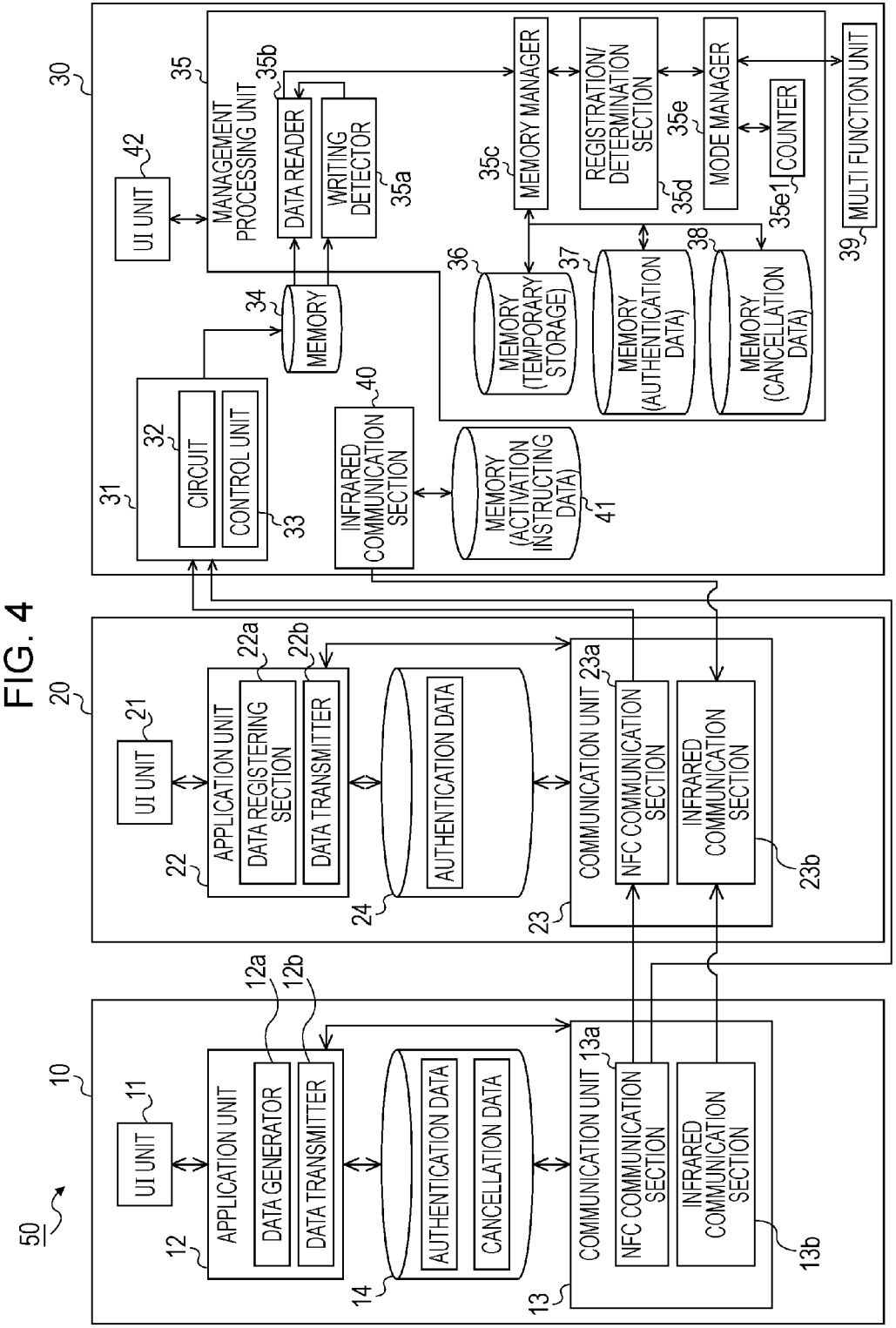
FIG. 4 is a block diagram illustrating examples of functional configurations of each information terminal and the printer.

FIG. 4 is a block diagram simply illustrating functions and configurations of the information terminal 10, the information terminal 20, and the printer 30. The information terminal 10 generally includes a user interface (UI) unit 11, an application unit 12, a communication unit 13, and a memory 14. The UI unit 11 receives an input of the manager through an input receiving section 11a (such as a button or a touch panel included in the information terminal 10) and performs a predetermined display on a screen 11b. The application unit 12 is a functional block realized by a main controller (such as a CPU) of the information terminal 10 in accordance with an application program stored in a predetermined storage medium such as a ROM or a RAM by the information terminal 10. The application unit 12 includes a data generator 12a and a data transmitter 12b. The communication unit 13 includes an infrared communication section 13b in addition to the NFC communication section 13a described above. The memory 14 stores the data and the like generated by the data generator 12a.

The information terminal 20 generally includes a UI unit 21, an application unit 22, a communication unit 23, and a memory 24. The UI unit 21 receives an input of the user through an input receiving section 21a and performs a predetermined display on a screen 21b. The application unit 22 is a functional block realized by a main controller (such as a CPU) of the information terminal 20 in accordance with an application program stored in a predetermined storage medium such as a ROM or a RAM by the information terminal 20. The application unit 22 includes a data registering section 22a and a data transmitter 22b. The communication unit 23 includes an infrared communication section 23b in addition to the NFC communication section 23a described above. The memory 24 stores the data and the like transmitted by the information terminal 10. Of course, in addition to the functions and configuration described above, each of the information terminals 10 and 20 has various functions and configurations such as a telephone function, a function of transmitting and receiving an electronic mail, and the like of a general cellular phone.

The printer 30 includes a management processing unit 35, memories 36, 37, and 38, a multi function unit 39, an infrared communication unit 40, a memory 41, and a UI unit 42 in addition to the IC tag 31 and the memory 34 (or the external memory 34a). The management processing unit 35 is a functional block realized by a main controller (such as a CPU) of the printer 30 in accordance with an application program stored in a predetermined storage medium such as a ROM or a RAM by the printer 30. The management processing unit 35 includes a writing detector 35a, a data reader 35b, a memory manager 35c, a registration/determination section 35d, and a mode manager 35e. Contents stored in the memories 36, 37, and 38 are managed by the memory manager 35c. The multi function unit 39 has a configuration (for example, a configuration such as a printing head realizing a print function, a driving circuit of the printing head, a carriage mechanism, and a sheet feeding mechanism) for realizing various functions of the printer 30 to display these functions collectively. The UI unit 42 receives an input of the user or the manager through an input receiving section (such as a button or a touch panel included in the printer 30) 42a and displays a predetermined display on a screen 42b.

2. Management of Printer Function

Processes performed by the printing apparatus management system 50 described above will be described. The processes can be broadly classified into a registration process of authentication data or cancellation data to the printer 30 or the information terminal 20, an authentication process of the information terminal by the printer 30, and a security mode cancellation process of the printer 30.

2-1. Registration Process of Authentication Data and Cancellation Data

Figure 5:
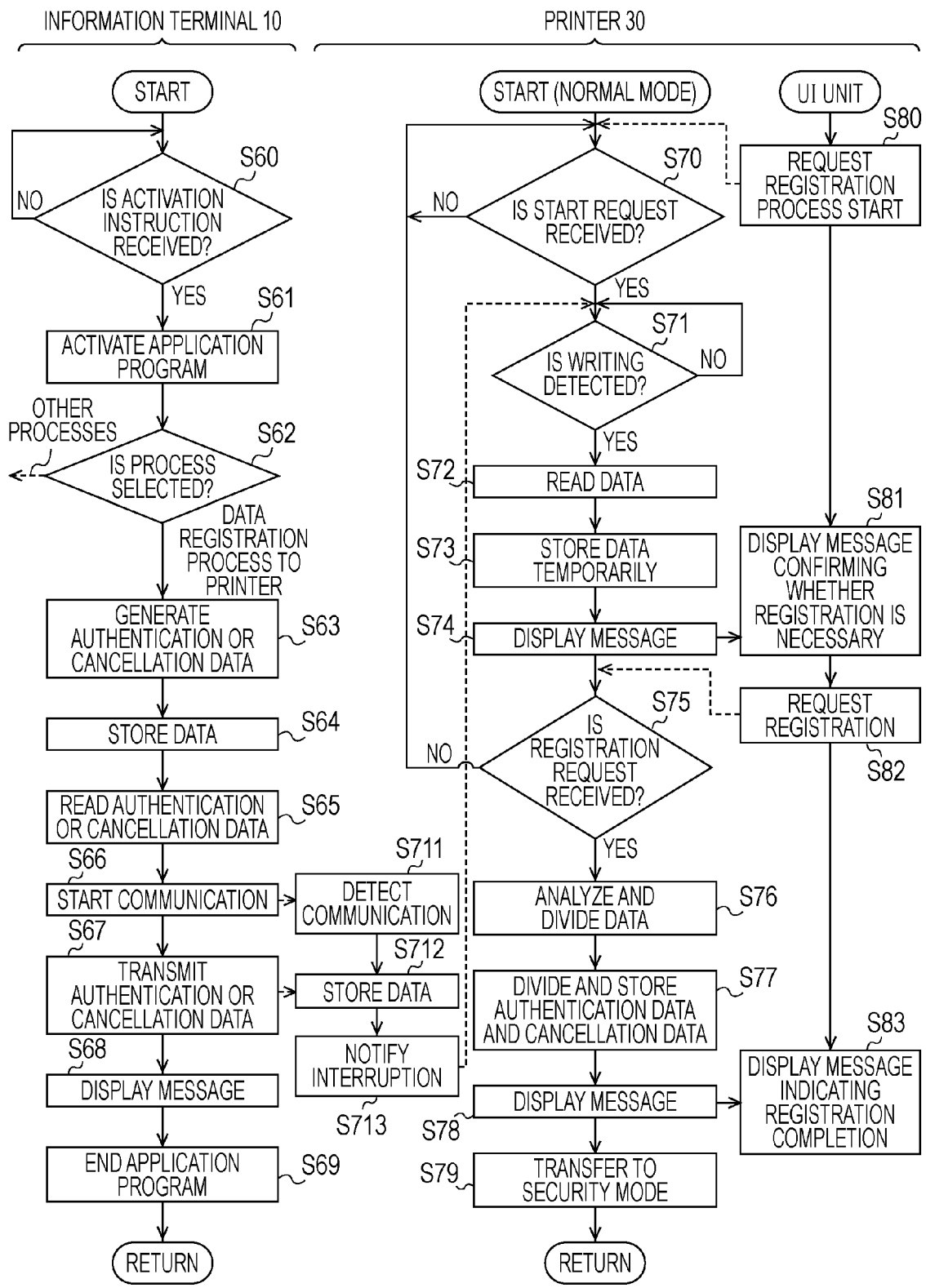
FIG. 5 is a flowchart illustrating an example of a data registration process performed by the information terminal and the printer.

FIG. 5 is a flowchart illustrating a registration process of authentication data or cancellation data for the printer 30. FIG. 5 shows the registration process performed by the information terminal 10 on the left, the registration process performed by the printer 30 in the middle, and the registration process performed by the UI 42 of the printer 30 on the right side.

In Step S60 (hereinafter, description of the term Step is omitted), the information terminal 10 determines whether an application program activation instruction is received through the UI unit 11. When it is determined that the activation instruction is received, the process proceeds to S61. In S61, the information terminal 10 activates an application program. Then, a function of the application unit 12 is activated. That is, when the manager gives the application program activation instruction by operation of the input receiving section 11a, processes subsequent to S61 is started.

In S62, the application unit 12 selects a process to be performed. The manager can select one of "a data registration process to a printer", "a data registration process to another information terminal", "a process of starting printer use", and "a process of canceling a security mode of a printer" as a process performed by the application unit 12 by operation of the input receiving section 11a. Accordingly, in S62, whether to select one of "the data registration process to a printer", "the data registration process to another information terminal", "the process of starting printer use", and "the process of canceling a security mode of a printer" is recognized through the UI unit 11. According to the selection result, subsequent processes are divided. In FIG. 5, it is assumed that "the process of registering data to a printer" is selected, and processes subsequent to S63 will be described.

In S63, the data generator 12a generates the authentication data and the cancellation data. The authentication data and the cancellation data are data generated by random combination of numerals and characters such as alphabet, for example, and data of which the details at the time of generation are different.

In S64, the data generator 12a stores the generated authentication data and the generated cancellation data in the memory 14. In this case, the information terminal 10 may be configured to receive authentication data or cancellation data generated by an external PC or an server from the external PC or the server and allow the data generator 12a to store the received authentication data or the received cancellation data in the memory 14, as well as allowing the data generator 12a to generate the authentication data and the cancellation data.

On the other hand, the printer 30 in a normal mode determines whether a request for starting the data registration process is received (S70). When it is determined that the request is received, the process proceeds to S71. The normal mode means a state (for example, a state where a power source is just supplied) where the printer 30 is not in any security state. In the normal mode, anyone can operate the printer 30. When the manager selects "a data registration process to a printer" among various menus by operation of the input receiving section 42a of the printer 30, the request for starting the data registration process is notified from the UI unit 42 to the main controller of the printer 30 (S80).

Description returns to the description of the process of the information terminal 10. In S65, the data transmitter 12b reads the authentication data and the cancellation data stored in S64 from the memory 14.

In S66, the NFC communication section 13a starts wireless communication with the IC tag 31 of the printer 30. That is, when the manager approaches a predetermined part (a part in which the NFC communication section 13a is formed) of the information terminal 10 to the IC tag 31, the electromagnetic induction described above is caused and the induced current is thus generated in the circuit 32 of the IC tag 31. As a result, writing the data from the NFC communication 13a to the IC tag 31 is possible.

In S67, by allowing the data transmitter 12b to control the NFC communication section 13a, the NFC communication section 13a is allowed to transmit the read authentication data and the cancellation data read in S65 to the IC tag 31.

On the other hand, in the printer 30, when the writing detector 35a of the management processing unit 35 detects that the data are written in the memory 34 in S71, the process proceeds to S72.

S711 to S713 show processes performed by the control unit 33 of the IC tag 31. When start of the wireless communication is detected at the time of approaching the NFC communication section 13a to the IC tag 31 (S711), the control unit 33 stores data received by the circuit 32 in the memory 34 (S712). Then, the control unit 33 notifies the writing detector 35a that the data are written in the memory 34 by an interruption process (S713). When the writing detector 35a receives the notification of the interruption process, the writing detector 35a detects the fact that the data are written in the memory 34. In S72, the data reader 35b reads the data written from the memory 34 and transfers the read data to the memory manager 35c.

In S73, the memory manager 35c temporarily stores (also called a temporary storage) the data transferred from the data reader 35b in the memory 36.

In S74, the UI unit 42 performs a predetermined display for confirming whether the registration of the temporarily stored data is necessary on the screen 42b. Then, a message that "May authentication data and cancellation data are registered?", for example, is displayed on the screen 42b (S81).

In S75, the management processing unit 35 determines whether a request for registering data is received. When it is determined that the request for registering data is received, the process proceeds to S76. The request for registering data is notified from the UI unit 42 to the management processing unit 35 (S82), when the manager operates the input receiving section 42a. When the management processing unit 35 cannot receive the request for registering data even though predetermined time elapses in processes subsequent to S74, for example, or when the management processing unit 35 receives an instruction for denying registration of the temporarily stored data from the UI unit 42, the process returns to S70.

In S76, the registration/determination section 35d allows the memory manager 35c to read the data temporarily stored in the memory 36 in S73, analyzes the read data, and divides the analyzed data into the authentication data and the cancellation data.

In S77, the registration/determination section 35d transfers the divided authentication data and the cancellation data to the memory manager 35c and allows the memory manager 35c to store the authentication data and the cancellation data to other memories (the memory 37 and the memory 38), respectively. The memory 37 storing the authentication data and the memory 38 storing the cancellation data are a nonvolatile memory.

In S78, the UI unit 42 performs a predetermined display for notifying that the registration of the authentication data and the cancellation data to the printer 30 is completed on the screen 42b. Then, a message that "Registration of authentication data and cancellation data is completed.", for example, is displayed on the screen 42b (S83).

In S79, the mode manager 35e performs a process of transferring the mode of the printer 30 from the normal mode to a security mode. The security mode refers to a mode of nullifying (interrupting) the whole basic functions (for example, such as a print function, a scanner function, a copy function, a label print function, and a backup storage function) of the multi function unit 39. Specifically, the mode manager 35e controls the multi function unit 39 not to operate, even when the operation on the input receiving section 42a is nullified (locked) or an instruction (for example, a printing work) associated with a predetermined operation from an external instruction apparatus (for example, a computer connected to the printer 30) is transmitted to the printer 30.

After the normal mode is transferred to the security mode, the process of the printer 30 ends in the registration process of the authentication data and the cancellation data to the printer.

In the information terminal 10, the UI unit 11 performs a predetermined display (for example, a display of a message that "Please confirm completion of a registration process on a screen of a printer") prompting to confirm a display on the screen 42b of the printer 30 on the screen 11b of the information terminal 10 (S68). Then, the application program ends (S69).

Figure 6:
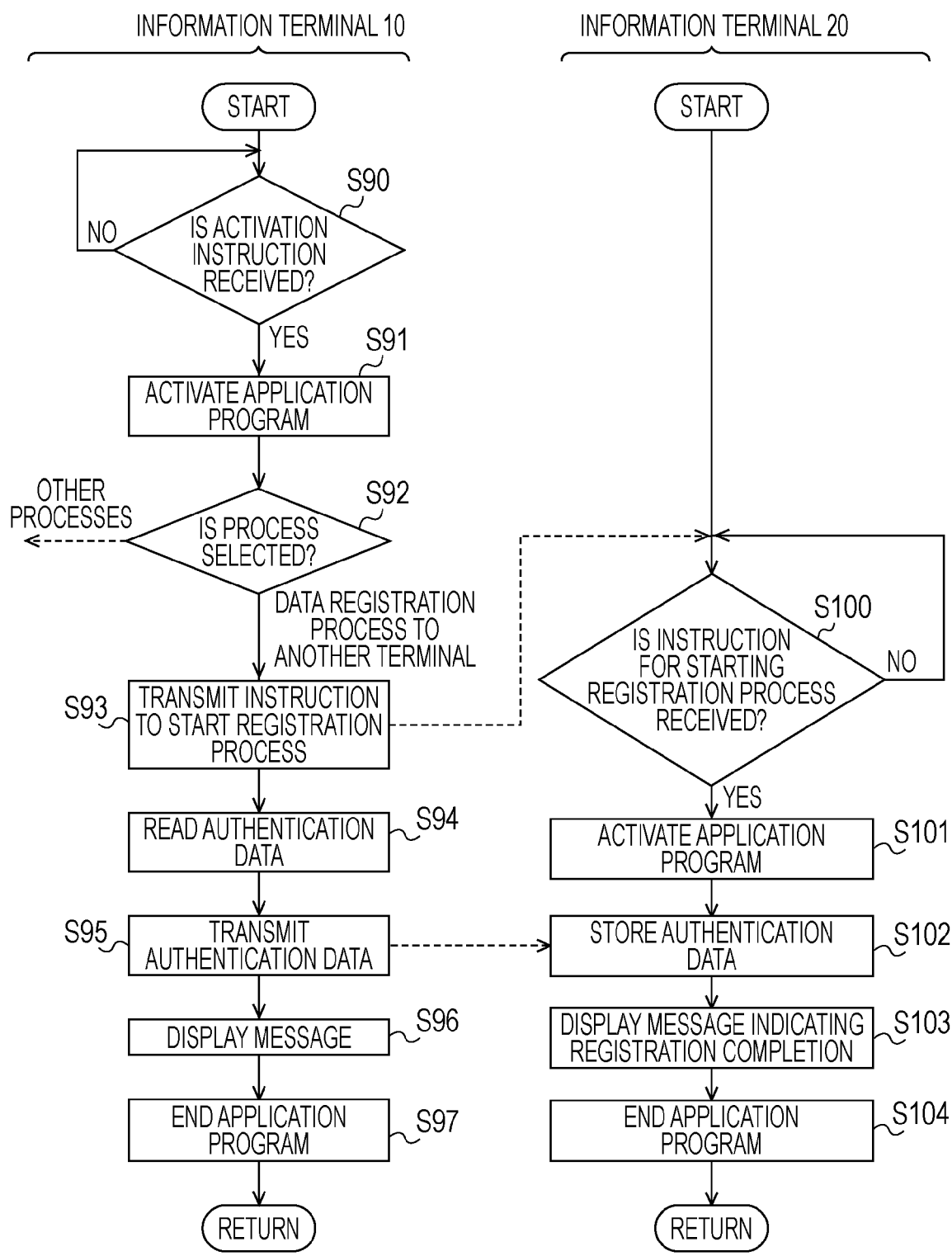
FIG. 6 is a flowchart illustrating an example of a data registration process between the information terminals.

FIG. 6 is a flowchart illustrating the registration process of registering the authentication data from the information terminal 10 to the information terminal 20. FIG. 6 shows the process performed by the information terminal 10 on the left side and the process performed by the information terminal 20 on the right side.

The information terminal 10 determines whether an application program activation instruction is received in S90, like S60. When it is determined that the activation instruction is received, the process proceeds to S91 and an application program is activated. In S92, the application unit 12 selects a process to be performed, like S62. In FIG. 6, it is assumed that "the data registration process to another information terminal" is selected in S92, and processes subsequent to S93 will be described.

In S93, the infrared communication section 13b transmits an infrared signal containing predetermined information giving an instruction for starting the registration process on the authentication data to the outside at a uniform time interval, for example.

On the other hand, the information terminal 20 determines whether the instruction for starting the registration process contained in the infrared signal is detected through an infrared receiver of the infrared communication section 23b (S100). When it is determined that the start of the instruction is detected, the process proceeds to S101 and the application is thus activated.

In S94, the data transmitter 12b reads the authentication data stored in the memory 14. In S95, by allowing the data transmitter 12b to control the NFC communication section 13a, the NFC communication section 13a is allowed to transmit the authentication data read in S94 to the NFC communication section 23a of the information terminal 20. of course, the NFC communication section 13a of the information terminal 10 is in a state of being approached to the NFC communication section 23a of the information terminal 20.

In the information terminal 20, the data registering section 22a stores the authentication data received by the NFC communication section 23a in the memory 24 (S102). Subsequently, the UI unit 21 displays a predetermined display (for example, a display of a message that "The registration of the authentication data has been completed") indicating that the registration of the authentication data to the information terminal 20 on the screen 21b of the information terminal 20 (S103). Then, the application program ends (S104).

In the information terminal 10, the UI unit 11 performs a predetermined display (for example, a display of a message that "Please confirm the completion of a registration process on a screen of a user terminal") prompting to confirm a display on a screen of another information terminal as a registration target of the authentication data on the screen 11b of the information terminal 10 (S96). Then, the application program ends (S97).

In the above description, the authentication data is transmitted and received between the information terminals 10 and 20 through the wireless communication conforming to the NFC standard. However, a method of exchanging data between the information terminals 10 and 20 is not particularly limited. Data can be exchanged between the information terminals 10 and 20 by use of all communication methods such as a method of using an electronic mail and a wireless communication standard called the so-called Bluetooth as well as the infrared communication.

The processes shown in FIGS. 5 and 6 perform the registration of the authentication data and the cancellation data to the printer 30 and the registration of the authentication data to the information terminal 20.

2-2. Authentication Process of Information Terminal

Figure 7:
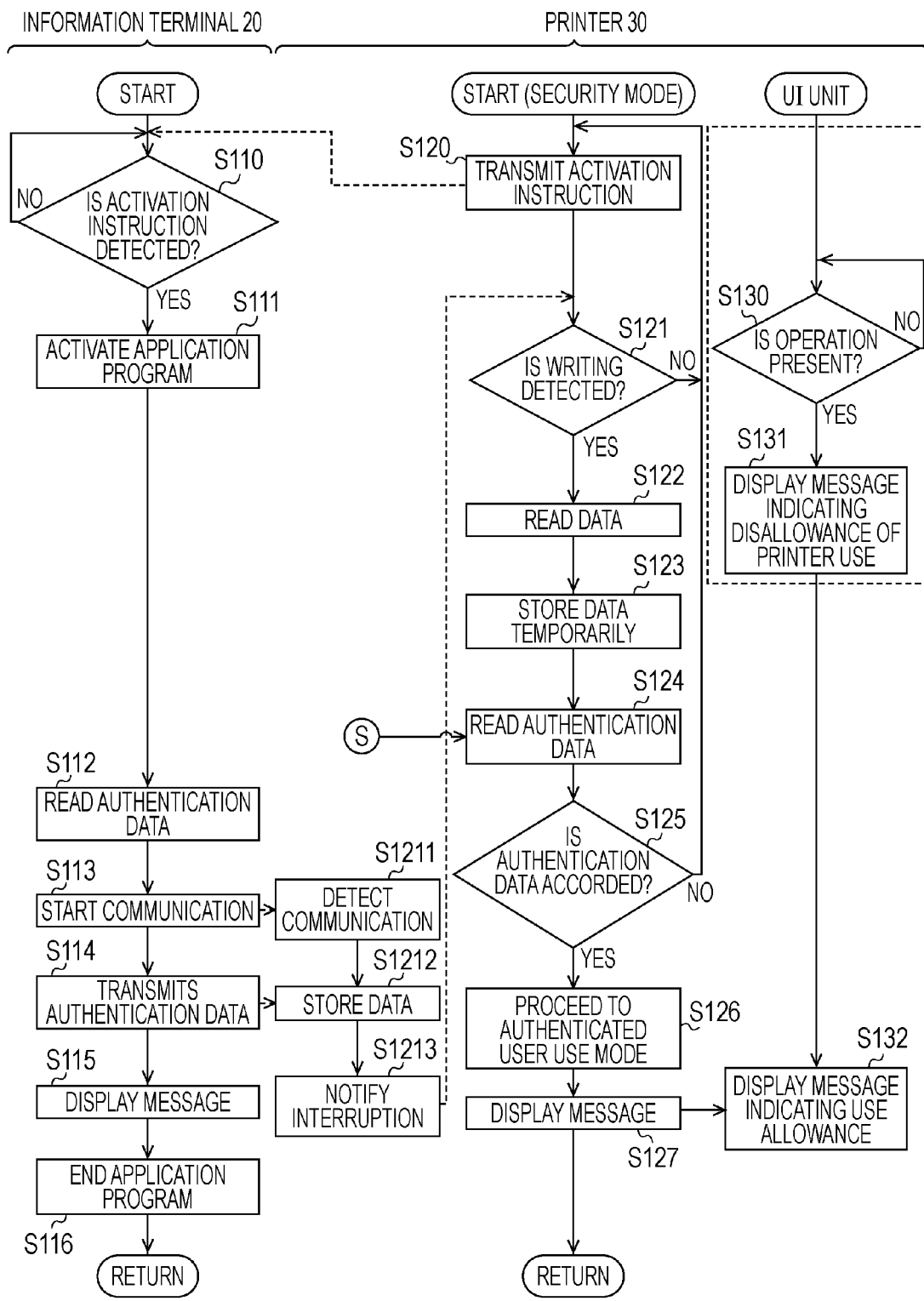
FIG. 7 is a flowchart illustrating an example of an authentication process of the information terminal by the printer.

FIG. 7 is a flowchart illustrating an authentication process performed on the information terminal (information terminal 20) of the user by the printer 30 in the security mode. FIG. 7 shows a process performed by the information terminal 20 on the left side, a process performed by the printer 30 in the middle, and a process performed by the UI unit 42 of the printer 30 on the right side.

In the security mode, the infrared communication unit 40 of the printer 30 transmits an infrared signal containing predetermined information indicating activation of the application program to the outside at a uniform time interval, for example (S120). The infrared communication unit 40 generates and transmits the infrared signal on the basis of the predetermined information (activation instructing data) giving an instruction for activating the application program stored in advance in the memory 41.

On the other hand, the information terminal 20 determines whether the instruction for activating the application program is detected through an infrared receiver of the infrared communication section 23b (S110). When it is determined that the instruction for activating the application program is detected, the process proceeds to S111 and the application program is activated.

In S112, the data transmitter 22b reads the authentication data stored in the memory 24. In S113, the NFC communication section 23a starts wireless communication with the IC tag 31. Of course, the NFC communication section 23a is in a state of being approached to the IC tag 31. In S114, by allowing the data transmitter 22b to control the NFC communication section 23a, the NFC communication section 23a is allowed to transmit the authentication data read from the memory 24 to the IC tag 31.

In the printer 30, when the writing detector 35a detects that the authentication data is written in the memory 34 in S121, the process proceeds to S122. In addition, when start of the wireless communication is detected by approach of the NFC communication section 23a to the IC tag 31 (S1211), the control unit 33 of the IC tag 31 stores the authentication data received by the circuit 32 in the memory 34 (S1212) and notifies the writing detector 35a that the authentication data is written in the memory 34 by the interruption process (S1213).

In S122, the data reader 35b reads the written authentication data from the memory 34 and transfers the read data to the memory manager 35c.

In S123, the memory manager 35c temporarily stores the authentication data transferred from the data reader 35b in the memory 36.

In S124, the registration/determination section 35d reads the authentication data temporarily stored in S123 and the authentication data stored beforehand in the non-volatile memory 37 (stored in S77 (see FIG. 5)), and determines whether the authentication data temporarily stored in S123 accord with one of the authentication data stored beforehand in the non-volatile memory 37 in S125. When the registration/determination section 35d determines that the authentication data temporarily stored in S123 accord with one of the authentication data stored beforehand in the non-volatile memory 37, the process proceeds to S126. Alternatively, when the registration/determination section 35d determines that the authentication data temporarily stored in S123 does not accord with any one of the authentication data, the process returns to S120 (the security mode continues).

In S126, the mode manager 35e transfers the mode of the printer 30 from the security mode to the authenticated user use mode (effective state). The authenticated user use mode refers to a mode in which the printer 30 is made to be usable by making the function of the multi function unit 39 effective under a predetermined condition. Accordingly, the mode manager 35e cancels the lock of the input receiving section 42a and allows an operation from the outside to be received.

In S127, the UI unit 42 performs a predetermined display for notifying that the printer can be used on the screen 42b. Then, a message that "You can use a printer.", for example, is displayed on the screen 42b (S132).

After the security mode is transferred to the authenticated user use mode, the process in the printer 30 ends in the authentication process on the information terminal 20.

In the information terminal 20, the UI unit 21 performs a predetermined display (for example, a display of a message that "Please confirm that a printer can be used on a screen") prompting to confirm a display on the screen 42b of the printer 30 on the screen 21b of the information terminal 20 (S115). Then, the application program ends (S116). As shown by a chain line in FIG. 7, in the security mode, the UI unit 42 inspects whether the input receiving section 42a is operated (S130). When the input receiving section 42a is operated, the UI unit 42 performs a predetermined display (for example, a display of a message that "You cannot use a printer if you are not authenticated from a printer) indicating that the printer 30 cannot be used as long as an authentication of the printer 30 is received on the screen 42b (S131).

Figure 8:
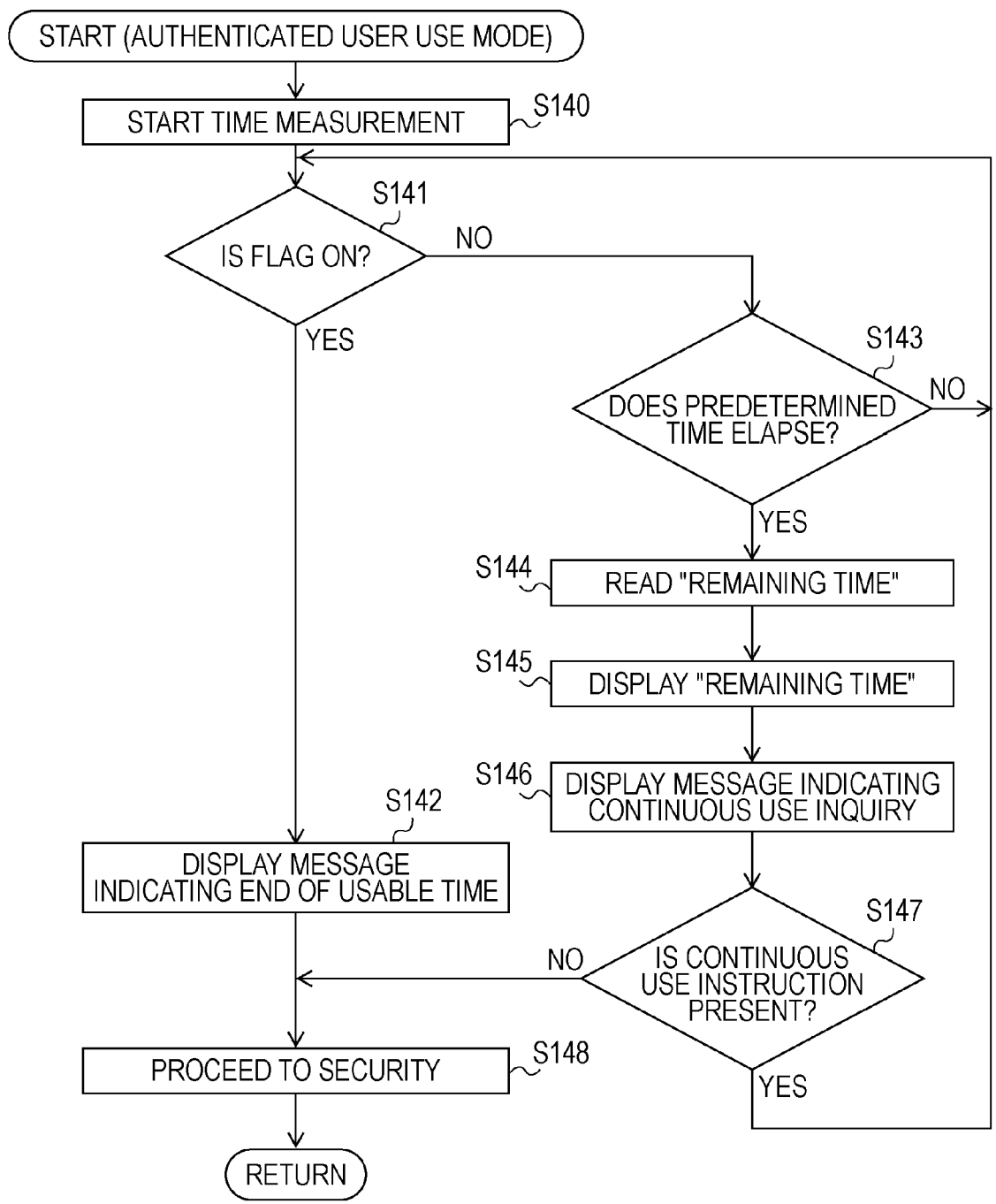
FIG. 8 is a flowchart illustrating an example of a process of the printer in an authenticated user use mode.

FIG. 8 is a flowchart illustrating a process performed by the printer 30 after the transfer to the authenticated user use mode.

In S140, the mode manager 35e sets a measurement result of the counter 35e1 (see FIG. 4) for time measurement to an initial value and then allows the counter 35e1 to start time measurement.

In S141, the mode manager 35e determines whether a predetermined flag representing end of the authenticated user use mode is ON (flag=1) or OFF (flag=0).

Figure 9:
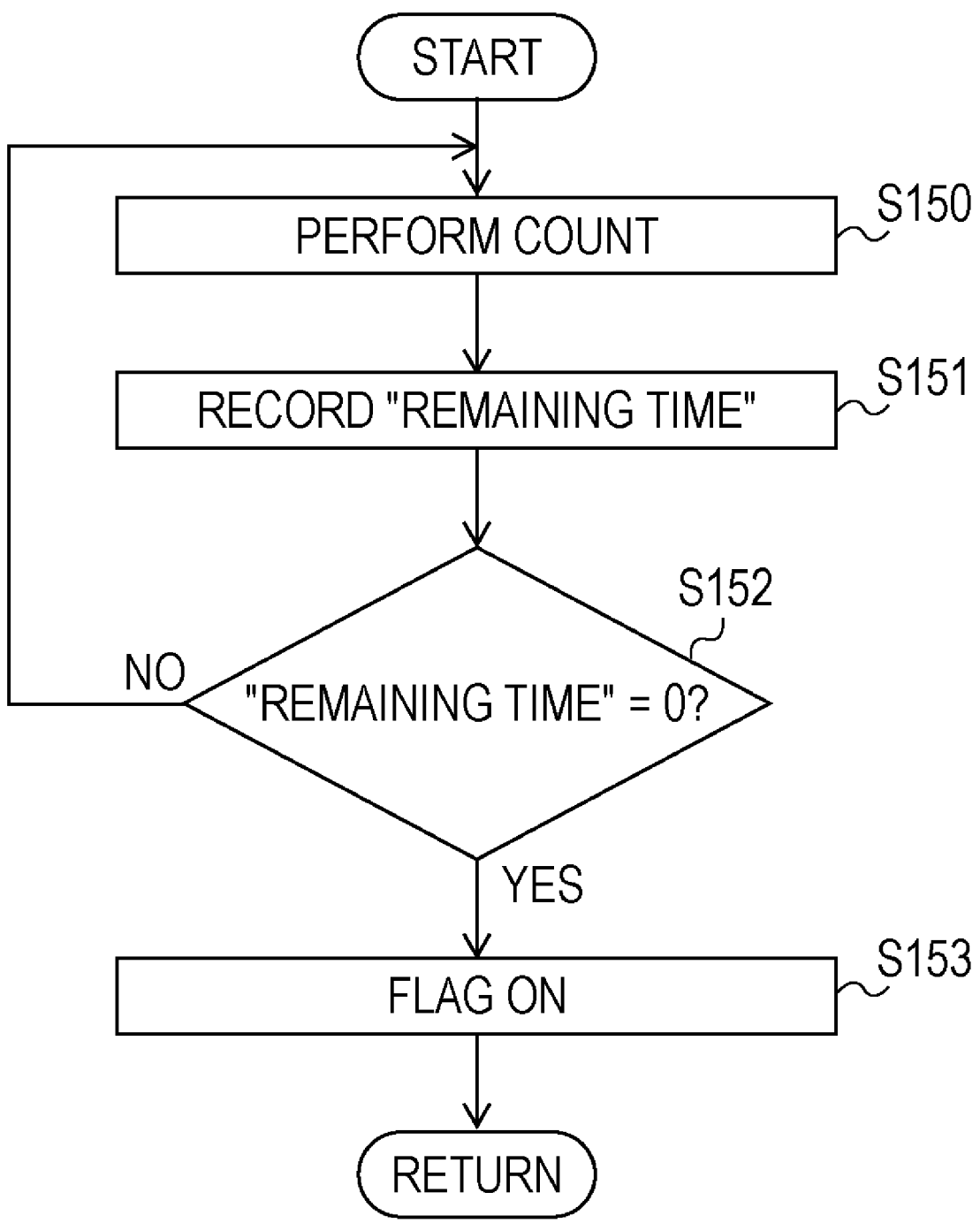
FIG. 9 is a flowchart illustrating an example of a process of a counter.

FIG. 9 is a flowchart illustrating flag ON and OFF processes performed by the counter 35e1. When an instruction for starting time measurement is given from the mode manager 35e, the counter 35e1 performs time count and decreases an initial value (S150). The initial value means the maximum value of remaining time in the authenticated user use mode and appropriate time such as 5 minutes is set. The counter 35e1 records all the remaining time of the authenticated user use mode at each time to a predetermined memory during the count (S151).

In S152, the counter 35e1 determines whether the remaining time is 0 second. When it is determined that the remaining time is not 0 second, the count continues. Alternatively, when it is determined that the remaining time is 0 second, the flag is switched from OFF to ON (S153) and the process of FIG. 9 ends.

The description will return to the description of FIG. 8. When it is determined that the flag is ON in S141, the process proceeds to S142. In S142, the mode manager 35e performs a predetermined display (for example, a display of a message that "Time for using a printer ends") indicating that printer usable time ends on the screen 42b by giving an instruction to the UI unit 42. After S142, the mode manager 35e allows the process to proceed to S148.

Alternatively, when it is determined that the flag is OFF in S141, the mode manager 35e allows the process to proceed to S143. In S143, the mode manager 35e determines whether predetermined time elapses from the nearest time of time (time at which "Yes" is determined in S143 described above) at which it is determined that the predetermined time elapses in the process of S143 described above and time at which the time measurement in S140 starts. The predetermined time in the determination of S143 refers to appropriate time which is shorter than the initial value and is time equal to 1 minute, for example.

When the mode manager 35e determines that the predetermined time elapses in S143, the process proceeds to S144. Alternatively, when the mode manager 35e determines that the predetermined time does not elapse, the determination of S141 is repeatedly performed. In S144, the mode manager 35e reads the remaining time of the authenticated user use mode at present time which is recorded in the predetermined memory by the counter 35e1 from the predetermined memory. In S145, the UI unit 42 displays the nearest remaining time read in S144 on the screen 42b. Then, the user of the printer 30 can recognize the remaining time, which is granted for the user, for using the printer 30.

In S146, the UI unit 42 performs a predetermined display (for example, a display of a message that "Do you continue to use a printer?") questioning whether the user continues to use the printer 30 on the screen 42b.

In S147, the mode manager 35e determines whether a continuous use instruction answered for the question of S146 is input through the input receiving section 42a. When it is determined that the continuous use instruction is input, the process returns to S141. Alternatively, when a continuous use denying instruction answered for the question of S146 is input through the input receiving section 42a or when any instruction is not input even though some time elapsed after the question, the process proceeds to S148.

After S142 or after "No" is determined in S147, the mode manager 35e transfers the mode of the printer 30 from the authenticated user use mode to the security mode in S148.

In this way, the mode of the printer 30 is transferred to the authenticated user use mode only during limited time after the authentication of the information terminal of the user in the security mode. Then, the user can use various functions of the printer 30. In addition, the printer 30 is configured to periodically display the remaining time of the authenticated user use mode during the authenticated user use mode on the screen 42b and question that the user intends to continuously use the printer 30. With such a configuration, even in a status where the remaining time is present, the authenticated user use mode can be interrupted and the mode of the printer 30 can be returned back to the security mode, when the user determines that the use of the printer 30 ends and further use is not necessary. Accordingly, even after the permitted user ends the use of the printer 30 and leaves the printer 30, it is possible to avoid a situation where the printer 30 is continuously in the authenticated user use mode.

2-3. Security Mode Cancellation Process

Figure 10:
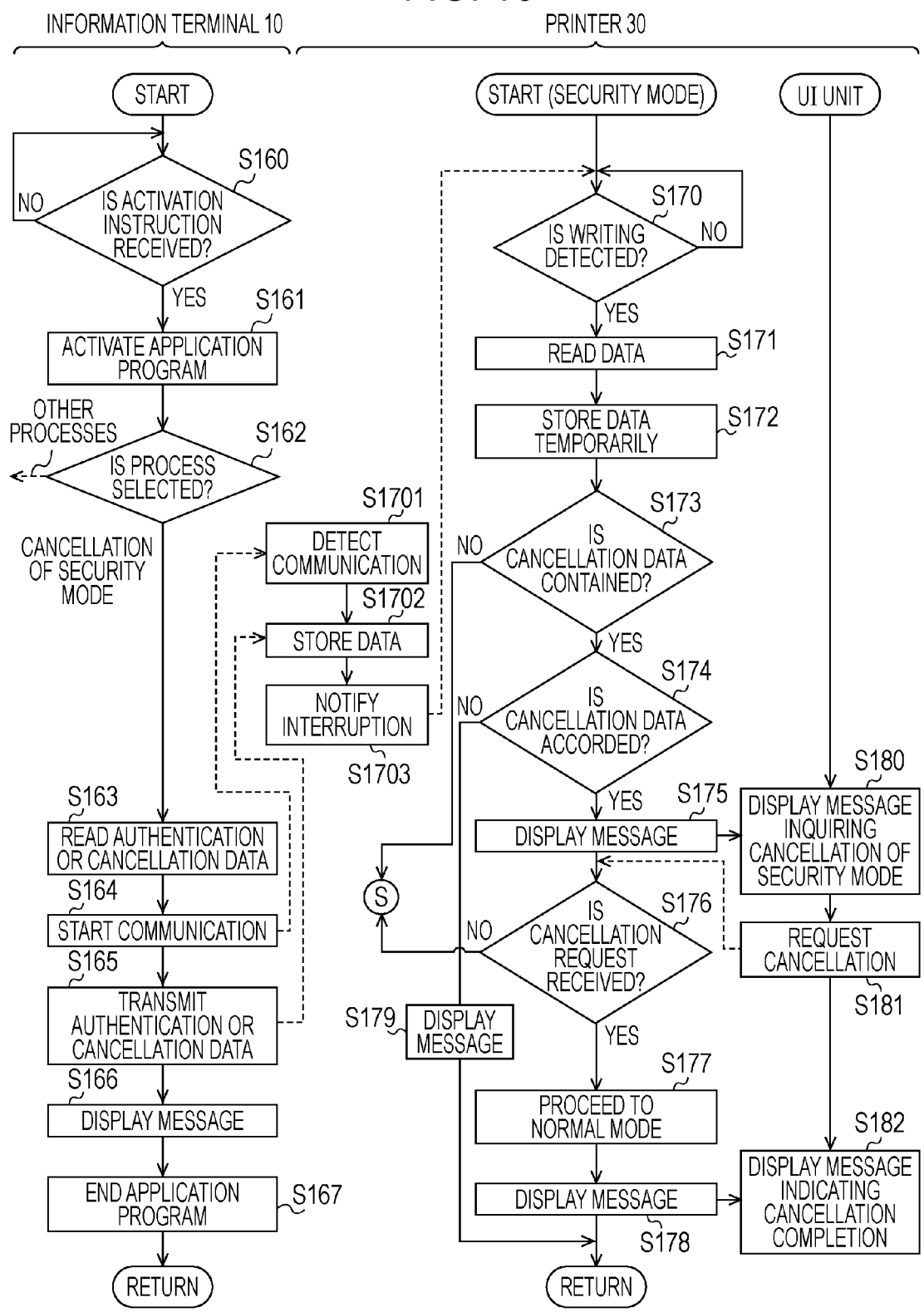
FIG. 10 is a flowchart illustrating an example of a security mode cancellation process of the information terminal and the printer.

FIG. 10 is a flowchart illustrating the cancellation process in the security mode of the printer 30. The cancellation process cancels the security mode on the printer 30 by allowing the information terminal 10 to carry out communication with the printer 30 in the security mode. FIG. 10 shows a process performed by the information terminal 10 on the left side, a process performed by the printer 30 in the middle, and a process performed by the UI unit 42 of the printer 30 on the right side.

The information terminal 10 determines whether an instruction for activating the application program is received in S160, like S60. When it is determined that the instruction for activating the application program is received, the process proceeds to S161 and the application program is activated. In S162, the application unit 12 selects a process to be processed, like S62. In FIG. 10, it is assumed that "the security mode cancellation process of the printer" is selected in S162, and processes subsequent to S163 will be described. In S163, the data transmitter 12b reads the authentication data and the cancellation data stored in the memory 14. In S164, the NFC communication section 13a starts wireless communication with the IC tag 31. Of course, it is assumed that the NFC communication section 13a of the information terminal 10 approaches the IC tag 31. In S165, by allowing the data transmitter 12b to control the NFC communication section 13a, the NFC communication section 13a is allowed to transmit the authentication data and the cancellation data read in S163 to the IC tag 31.

In the printer 30, when the writing detector 35a detects that the data are written in the memory 34 in S170, the process proceeds to S171. In addition, when start of the wireless communication is detected by approach of the NFC communication section 13a to the IC tag 31 (S1701), the control unit 33 of the IC tag 31 stores the authentication data received by the circuit 32 in the memory 34 (S1702) and notifies the writing detector 35a that the authentication data is written in the memory 34 by the interruption process (S1703). In S171, the data reader 35b reads the written data from the memory 34 and transfers the read data to the memory manager 35c. In S172, the memory manager 35c temporarily stores the data transferred from the data reader 35b in the memory 36.

In S173, the registration/determination section 35d analyzes the data temporarily stored in the memory 36 in S172 and determines whether the data is data (which is data constituted by the authentication data and the cancellation data) containing the cancellation data or data (which is data constituted by only the authentication data) not containing the cancellation data. When it is determined that the data is the data containing the cancellation data, the process proceeds to S174. Alternatively, when it is determined that the data is the data not containing the cancellation data, the process proceeds to S124 (see FIG. 7). When only the authentication data is written from the information terminal 10 to the printer 30 during the security mode, the authentication process on the information terminal 10 is performed on the basis of the written authentication data. That is, not only in the authentication process on the information terminal 20 of the user but also in the authentication process on the information terminal 10 of the manager, the mode of the printer 30 can be transferred from the security mode to the authenticated user use mode. In addition, in the information terminal 10, when the application unit 12 selects "the process of starting printer use" in S162, only the authentication data in S165 is transmitted.

In S174, the registration/determination section 35d determines whether the cancellation data temporarily stored in S172 and the cancellation data stored beforehand in the nonvolatile memory 38 (stored in the process of S77 (see FIG. 5)) accord with each other. When it is determined that the cancellation data accord with each other, the process proceeds to S175. Alternatively, when it is determined that the cancellation data do not accord with each other, the process proceeds to S179. In S175, the UI unit 42 performs a predetermined display questioning whether to cancel the security mode on the screen 42b. Then, a message that "May a security mode of a printer be canceled?", for example, is displayed on the screen 42b (S180).

In S176, the management processing unit 35 determines whether a request for canceling the security mode is received. When the request for canceling the security mode is received, the process proceeds to S177. The request for canceling the security mode is notified to the management processing unit 35 by allowing the manager to operate the input receiving section 42a after displaying the message of S180 (S181). When the management processing unit 35 cannot receive the request for canceling the security mode even though predetermined time elapsed in processes subsequent to S175, for example, or even when the management processing unit 35 receives an instruction for denying the cancellation of the security mode from the input receiving section 42a, the process proceeds to S124 (see FIG. 7).

In S177, the mode manager 35e transfers the mode of the printer 30 from the security mode to the normal mode. The mode manager 35e cancels the lock of the input receiving section 42a to allow the operation from the outside to be received. When the mode is transferred to the normal mode, the memory manager 35c erases the authentication data and the cancellation data stored in the memories 37 and 38, respectively. In this way, the previous authentication data and the previous cancellation data are erased, and then a case where the authentication data and the cancellation data are newly written by the information terminal 10 is prepared. In addition, in the normal mode, use is not limited by time, like the authenticated user use mode shown in FIG. 8. In S178, the UI unit 42 performs a predetermined display notifying that the cancellation of the security mode is completed on the screen 42b. Then, a message that "A security mode of a printer has been cancelled.", for example, is displayed on the screen 42b (S182). On the other hand, in S179, since appropriate cancellation data cannot be obtained from the outside, the UI unit 42 performs a predetermined display indicating that the security mode is not cancelled on the screen 42b. Then, a message that "A security mode of a printer cannot be cancelled.", for example, is displayed on the screen 42b. After S179, the security mode is maintained.

In the information terminal 10, the UI unit 11 performs a predetermined display (for example, a display of a message that "Please confirm that a security mode has been cancelled on a screen.") prompting to confirm a display on the screen 42b of the printer 30 on the screen 11b of the information terminal 10 (S166). Then the application program ends (S167).

3. Other Embodiments

In FIG. 8, the authenticated user use mode is configured to be limited by time, but continuity of the authenticated user use mode can be restricted by another factor other than time.

For example, in the printer 30, the authenticated user use mode may be restricted during a period in which the communication with an authenticated information terminal (for example, the information terminal 20) continues and the authenticated user use mode may be continued. In this case, even after the information terminal 20 transmits the authentication data from the NFC communication section 23a to the IC tag 31 in S114 (see FIG. 7), specific data is continuously transmitted from the NFC communication section 23a. Here, the specific data refers to data containing a signal requesting continuity of the authenticated user use mode. In this case, the information terminal 20 is put on the upper surface 45 of the printer 30, for example.

In the printer 30, the mode manager 35e inspects that the specific data is written to the printer 30 through the writing detector 35a or the data reader 35b after the transfer to the authenticated user use mode in S126 (see FIG. 7). In addition, while the writing of the specific data is continuously detected, the authenticated user use mode continues. When the writing of the specific data discontinues over predetermined time, the authenticated user use mode is interrupted to return to the security mode. In the printer 30, while the writing of the specific data continues, the UI unit 42 may continuously perform a predetermined display (for example, a display of a message that "You can use a printer.") notifying that the use of the printer 30 is possible on the screen 42b. With such a configuration, the printer 30 may be set to the authenticated user use mode, while the user of the information terminal 20 puts the information terminal 20 on the upper surface 45 of the printer 30 in order to use the printer 30 (in order to obtain the authentication of the printer 30), the display in S132 (see FIG. 7) is performed, and the user catches the information terminal 20 from the upper surface 45. Accordingly, it is possible to effectively prevent a user other than the user of the information terminal 20 from using the printer 30.

In the printer 30, the authenticated user use mode may be continued only within a period in which a consumed amount of a predetermined consumption supply does not exceed a predetermined consumed amount. The predetermined consumption supply refers to a medium (such as a sheet or a disk medium), ink, or the like which is a print target. In this case, in the printer 30, after the mode is transferred to the authenticated user use mode in S126, the mode manager 35e inspects each process (for example, a printing process) of the multi function unit 39 and continuously detects the consumed amount (for example, the printed number of sheets or a consumed amount of ink) of a consumption supply in each process of the multi function unit 39. When the consumed amount of the consumption supply after the transfer to the authenticated user use mode in S126 exceeds to a predetermined threshold value, the authenticated user use mode is forcedly stopped to return to the security mode. The printer 30 may display a remaining amount of a usable consumption supply (which is a difference between the consumed amount of the consumption supply after the transfer to the authenticated user use mode in S126 and the threshold value) on the display 42b during performing the authenticated user use mode, instead of displaying the remaining time of the authenticated user use mode described in S145 (see FIG. 8). With such a configuration, it is possible to prevent large consumption of a consumption supply caused by a user. In addition, even if a user that is not permitted uses the printer 30, damage to the consumption supply can be suppressed low.

The printer 30 may set a different function or the like supplied in the authenticated user use mode for every authenticated user (information terminal). In this case, the information terminal 10 generates plural different authentication data to store the plural different authentication data in the memory 14 in S63 (see FIG. 5) and transmits the plural authentication data from the NFC communication section 13a to the IC tag 31 in S67 (see FIG. 5). As a result, the plural authentication data are written in the memory 34 of the printer 30 and stored in a non-volatile memory 37. Here, the plural authentication data generated by the information terminal 10 are said to each contain rank information. In addition, the information terminal 10 reads one of the plural authentication data stored in the memory 14 in S94 (see FIG. 6) and transmits the read authentication data from the NFC communication section 13a to the NFC communication section 23a of the information terminal 20 in S95 (see FIG. 6). As a result, in the information terminal 20, the authentication data containing one kind of rank information is stored in the memory 24. The information terminal 10 transmits the authentication data containing the rank information corresponding to a user rank of the information terminal 20 as an authentication data registration target to the information terminal 20 as the registration target.

The user rank of the information terminal 20 refers a rank of a user viewed from the manager. For example, when the manager is an employer of a shop where the printer 30 is installed, the manager classifies the users according to ranks (for example, a user rank classification such as a high level member, a middle level member, and a general level member)

on the basis of the use number of the shop or contribution to the shop. When the manager distributes (registers) the authentication data to the information terminal 20 of each user, the manager transmits the authentication data containing the rank information (for example, rank information=A in the high level member, rank information=B in the middle level member, and rank information=C in the general member) corresponding to the user ranks of each user by operation of the information terminal 10.

When the authentication data contains the rank information, the mode manager 35e allows only a function according to the rank information of the authentication data among various functions of the multi function unit 39 to be effective, when the mode is transferred to the authenticated user use mode in S126 (see FIG. 7).

For example, the mode manager 35e limits the function made allowed to be effective in the authenticated user use mode with reference to a information table 200 shown in FIG. 11. FIG. 11 shows an example of a correspondence relation among the rank information A to C, the functions (the print function, the copy function, the scanner function, the label print function, the backup storage function, and the like) of printer 20, and detailed setting (color and monochrome, print quality, and the like) of the functions. The mode manager 35e reads each function of the printer 30 or the detailed setting on each function corresponding to the rank information contained in the authentication data of the information terminal 20 determined to accord with each other in S125 (see FIG. 7) from the information table 200, and determines the functions of the multi function unit 39 which are allowed to be effective in the authenticated user use mode on the basis of the read result.

As a result, in the authenticated user use mode, it is possible to allow functions supplied by the user 30 for every user to be different in such a manner that, for example, a user corresponding to the rank information A can use all the functions of the multi function unit 39, a user corresponding to the rank information B can use the functions other than the label print function and the backup storage function, and a user corresponding to the rank information C can use only the scanner function, the print function conforming to a monochrome and standard image quality, and the copy function. For example, the information table 200 is stored in advance in a predetermined memory provided in the printer 30.

4. Summary

In the printing apparatus management system 50 according to this embodiment, the IC tag 31 is attached to the printer 30 to connect the memory provided in the IC tag 31 to the memory provided in the printer 30. By approaching the information terminal 10 provided in the NFC communication section 13a to the printer 30, the authentication data and the cancellation data are written from the information terminal 10 in the memory of the printer 30 through wireless communication between the NFC communication section 13a and the IC tag 31. Then, the mode of the printer 30 is transferred from the normal mode to the security mode and the authentication data is written from the information terminal 10 to the memory of the information terminal 20. In addition, by approaching the information terminal 20 including the NFC communication section 23a to the printer 30, the authentication data is written from the information terminal 20 in the memory of the printer 30 through wireless communication between the NFC communication section 23a and the IC tag 31 and the printer 30 performs the authentication process on the basis of the determination in which the authentication data written by the information terminals 10 and 20 accord with each other. Then, the mode of the printer 30 is transferred from the security mode to the authenticated user use mode. In addition, in the authenticated user use mode, all the functions of the printer 30 or predetermined functions according to each of the user ranks can be used under the conditions such as time, the fact that the continuous communication between the information terminal 20 and the printer 30 is carried out or not, or the consumed amount of the consumption supply.

That is, since the configuration of the printer 30 necessary for writing the data used to manage the security of the printer 30 can be simplified, it is possible to realize the printing apparatus management system 50 with lower cost. In addition, since the printer 30 after the transfer to the security mode can be used only by the information terminal 10 or the information terminal 20 which receives the registration of the authentication data from the information terminal 10, it is possible to strictly manage the printer 30 even when the printer 30 is installed in a public place and prevent illegal use of a person that is not permitted.

Additionally, by approaching the information terminal 10 to the printer 30 in the security mode, the cancellation data is written from the information terminal 10 in the memory of the printer 30 through wireless communication between the NFC communication section 13a and the IC tag 31 and the printer 30 is allowed to determine whether the cancellation data written in the normal mode and the cancellation data written in the security mode accord with each other. Then, the security mode is transferred to the normal mode. Accordingly, since the manager carries out maintenance necessary for the printer 30 which returns to the normal mode or can again register and fix new authentication data and new cancellation data to the printer 30, it is possible to improve security of the printer 30.

What is claimed is:

1. A printing apparatus management system comprising:
a printing apparatus which includes an IC tag performing wireless communication with the outside and a memory being connected to the IC tag; and
a first information terminal which has at least a function of writing information in the memory through wireless communication with the IC tag,
wherein the first information terminal maintains authentication data used by the printing apparatus, writes the authentication data in the memory, and transmits the authentication data to another information terminal, and
wherein the printing apparatus interrupts a predetermined function, when the authentication data is written by the first information terminal, and in a state where authentication data is written in the memory by the first information terminal or an information terminal other than the first information terminal in the interruption state, the printing apparatus makes the predetermined function effective, when the authentication data written by the first information terminal before the interruption state and the authentication data written by the first information terminal or the information terminal other than the first information terminal after the interruption state accord with each other,
wherein the first information terminal generates cancellation data used for the printing apparatus to cancel the interruption state and writes the cancellation data in the memory together with the authentication data, and
wherein in a state where the cancellation data is written in the memory by the first information terminal in the interruption state, the printing apparatus cancels the interruption state and erases the authentication data and the cancellation data written in the memory, when the cancellation data written before the interruption state and the cancellation data written after the interruption state accord with each other.

2. The printing apparatus management system according to claim 1, wherein the printing apparatus is connected to the IC tag by attaching or embedding the IC tag to or in the printing apparatus and connecting an electrode of a memory provided in advance in the printing apparatus to an electrode of the IC tag.

3. The printing apparatus management system according to claim 1, wherein the printing apparatus further includes a connector used to mount an external memory and is connected to the IC tag by mounting the external memory connected to the IC tag on the connector.

4. The printing apparatus management system according to claim 1, wherein the printing apparatus makes the predetermined function effective only within predetermined time, when it is determined that the authentication data accord with each other.

5. The printing apparatus management system according to claim 1, wherein when it is determined that the authentication data accord with each other, the printing apparatus inspects whether the wireless communication with the information terminal writing the accorded authentication data after the interruption state continues to be carried out and makes the predetermined function effective only within time in which the wireless communication continues to be carried out.

6. The printing apparatus management system according to claim 1, wherein when it is determined that the authentication data accord with each other, the printing apparatus makes the predetermined function effective only within time in which a consumed amount of a consumption supply in the printing apparatus does not exceeds a predetermined consumed amount.

7. The printing apparatus management system according to claim 1,
wherein the first information terminal generates plural different authentication data, writes the plural different authentication data in the memory, and transmits several authentication data among the plural authentication data to another information terminal, and
wherein in a state where authentication data is written in the memory by an information terminal other than the first information terminal in the interruption state, the printing apparatus makes only a function according to the authentication data written by the information terminal other than the first information terminal effective, when the authentication data written by the information terminal other than the first information terminal accords with one of the authentication data written by the first information terminal before the interruption state.

8. A printing apparatus management method in which a printing apparatus which includes an IC tag performing wireless communication with the outside and a memory being connected to the IC tag and a first information terminal which has at least a function of writing information in the memory through wireless communication with the IC tag are used, the printing apparatus management method comprising:
maintaining authentication data used by the printing apparatus and writing the authentication data in the memory by the first information terminal;
transmitting the authentication data to another information terminal by the first information terminal;
interrupting a predetermined function by the printing apparatus, when the authentication data is written by the first information terminal;
determining whether the authentication data written in the memory by the first information terminal before the interruption state and the authentication data written in the memory by an information terminal other than the first information terminal after the interruption state accord with each other by the printing apparatus, when the authentication data is written by the first information terminal or the information terminal other than the first information terminal in the interruption state;
making the predetermined function effective by the printing apparatus, when the authentication data accord with each other;
generating cancellation data used for the printing apparatus to cancel the interruption state and writing the cancellation data in the memory together with the authentication data by the first information terminal;
determining whether the cancellation data written before the interruption state and the cancellation data written after the interruption state accord with each other, when the cancellation data is written in the memory by the first information terminal in the interruption state; and
canceling the interruption state and erasing the authentication data and the cancellation data written in the memory by the printing apparatus, when the cancellation data accord with each other.

9. A non-transitory computer readable storage medium storing executable code, which when executed by a processor, causes the processor to perform a printing apparatus management method in a printing apparatus, the printing apparatus management method comprising the steps of:
interrupting a predetermined function, when the authentication data is written by a first information terminal in a memory connected to an IC tag included in the printing apparatus through wireless communication with the IC tag, wherein the authentication data is maintained by the first information terminal and transmitted to another information terminal;
determining whether the authentication data written in the memory by the first information terminal before the interruption process and the authentication data written in the memory by the first information terminal or an information terminal other than the first information terminal after the interruption process accord with each other, when the authentication data is written by the first information terminal or the information terminal other than the first information terminal in the interruption process;
making the predetermined function effective, when the authentication data accord with each other;
determining whether cancellation data written before the interruption state and the cancellation data written after the interruption state by the first information terminal in the memory accord with each other, when the cancellation data is written in the memory by the first information terminal in the interruption state; and
canceling the interruption state and erasing the authentication data and the cancellation data written in the memory, when the cancellation data accord with each other.

* * * * *